(12) United States Patent
McCloud et al.

(10) Patent No.: US 12,709,214 B2
(45) Date of Patent: Aug. 18, 2026

(54) FLUSH MOUNTED SLIDE RAIL ASSEMBLY

(71) Applicant: Wabash National, L.P., Lafayette, IN (US)

(72) Inventors: Travis S. McCloud, Malabar, FL (US); Jian Feng Tong, Dallas, TX (US)

(73) Assignee: Wabash National, L.P., Lafayette, IN (US)

( * ) Notice: Subject to any disclaimer, the term of this patent is extended or adjusted under 35 U.S.C. 154(b) by 357 days.

(21) Appl. No.: 18/243,730

(22) Filed: Sep. 8, 2023

(65) Prior Publication Data

US 2024/0083337 A1 Mar. 14, 2024

Related U.S. Application Data

(60) Provisional application No. 63/576,432, filed on Sep. 9, 2022.

(51) Int. Cl.
*B60P 7/00* (2006.01)
*B60P 7/08* (2006.01)

(52) U.S. Cl.
CPC .................................. *B60P 7/0815* (2013.01)

(58) Field of Classification Search
CPC ... B60P 7/0815; B62D 25/2054; B62D 33/02; B62D 53/08; B62D 53/0802; B62D 53/0842
USPC .......................................................... 410/104
See application file for complete search history.

(56) References Cited

U.S. PATENT DOCUMENTS 10,479,419 B2 11/2019 Storz et al.
10,919,579 B2 2/2021 Mccloud et al.
11,338,862 B2 5/2022 Mccloud et al.
11,400,987 B2 8/2022 Mccloud et al.
2016/0101752 A1 * 4/2016 Batzer .................. B60R 19/565
293/126

FOREIGN PATENT DOCUMENTS

WO 2016/137974 A1 9/2016

* cited by examiner

*Primary Examiner* — Steven O Douglas

(74) *Attorney, Agent, or Firm* — Faegre Drinker Biddle & Reath LLP

(57) ABSTRACT

A cargo body, which may be found on a cargo vehicle, is provided. The cargo body includes a floor assembly that includes a first side and a second side. The cargo body further includes a slide rail assembly. The slide rail assembly includes one or more slide rails. The one or more slide rails are removably coupled to the floor assembly.

22 Claims, 12 Drawing Sheets

164a
198
196
156
194
136
116R
138
164b
112
152
160
170
130
168
172
116L
152
152
140
152
148

FLUSH MOUNTED SLIDE RAIL ASSEMBLY

CROSS REFERENCE TO RELATED APPLICATIONS

The present applications claims priority to U.S. Provisional Patent Application No. 63/576,432, filed on Sep. 9, 2022, and entitled "A FLUSH MOUNTED SLIDE RAIL ASSEMBLY," the disclosure of which is hereby expressly incorporated by reference herein in its entirety.

TECHNICAL FIELD

The present disclosure relates generally to slide rail assemblies, and more specifically, to slide rail assemblies of cargo vehicles.

BACKGROUND

Cargo vehicles are used in the transportation industry for transporting many different types of cargo. Cargo vehicles include a cargo body, such as a trailer, truck body, van body, or flat-bed trailer, with a floor assembly. Some cargo vehicles include slide rail assemblies that are bonded to main beams that extend from the floor assembly. The main beams extend longitudinally along an entire length of the floor assembly.

SUMMARY

Aspects of the present disclosure relate generally to a cargo body that has a floor assembly and a slide rail assembly. The slide rail assembly is removably coupled to and generally flush with the floor assembly.

In some examples, a cargo body is provided. The cargo body includes a floor assembly that includes a first side and a second side. The cargo body further includes a slide rail assembly. The slide rail assembly includes one or more slide rails. The one or more slide rails are removably coupled to the second side of the floor assembly.

In some examples, a cargo body is provided. The cargo body includes a floor assembly that includes a first side and a second side. The cargo body further includes a slide rail assembly. The slide rail assembly includes one or more slide rails. At least a portion of the slide rail assembly is flush with the second side of the floor assembly.

In some examples, a cargo body is provided. The cargo body includes a floor assembly that includes a first side and a second side. The cargo body further includes one or more channels that are directly coupled to the floor assembly, on the second side. The cargo body further include a first wall and a second wall. The first and second walls extend orthogonally to the first side and the second side of the floor assembly. The one or more channels are fastened into the first wall and the second wall.

In some examples, the floor assembly is a composite floor assembly.

In some examples, at least a portion of the slide rail assembly is flush with the second side of the floor assembly.

In some examples, the one or more slides rails are removably coupled to the floor assembly, via one or more brackets.

In some examples, the floor assembly includes a plurality of transverse beams.

In some examples, the one or more slide rails are oriented generally orthogonal to the plurality of transverse beams.

In some examples, one or more channels are coupled to the floor assembly, on the second side. The one or more channels are disposed between the first side, and at least a portion of the second side.

In some examples, the slide rail assembly includes one or more channels. The one or more channels are flush with the second side of the floor assembly. Further, the one or more slide rails are coupled to the one or more channels.

In some examples, the one or more channels include steel.

In some examples, the cargo body further includes a first wall and a second wall. The first and second walls extend generally orthogonal to the first side and the second side of the floor assembly. The one or more channels are fastened into the first wall and the second wall.

In some examples, a plurality of connectors are embedded in the composite floor assembly.

In some examples, the cargo body further includes one or more channels. The one or more channels are coupled to the composite floor assembly, via the plurality of connectors.

In some examples, the one or more slide rails are removably coupled to the floor assembly.

In some examples, the cargo body further includes a slide rail assembly that includes one or more slide rails.

In some examples, the one or more slide rails are in contact with the second side of the floor assembly.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
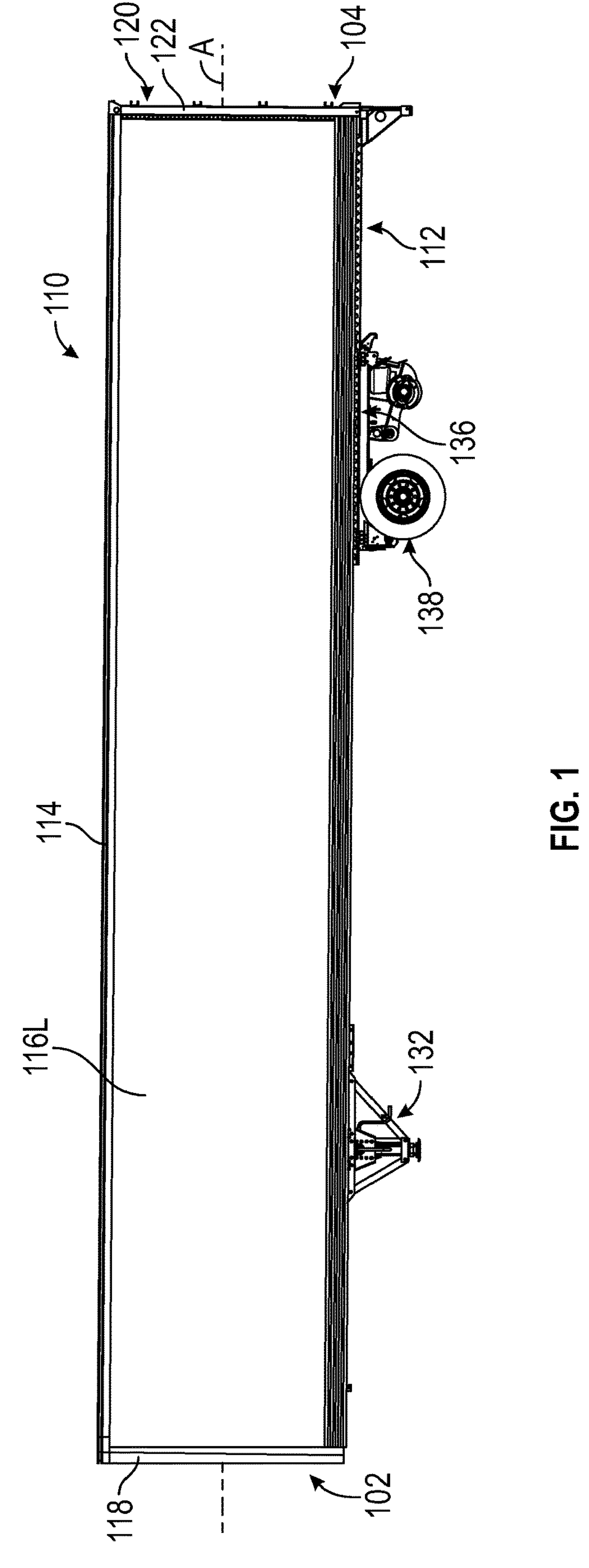
FIG. 1 illustrates a side elevational view of an exemplary semi-trailer, according to some aspects described herein.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the structures and components disclosed herein may be embodied in many different forms, several specific embodiments are discussed herein with the understanding that the embodiments described in the present disclosure are to be considered only exemplifications of the principles described herein, and the disclosure is not intended to be limited to the embodiments illustrated. Further, throughout the disclosure, the terms "about", "substantially", and "approximately" mean plus or minus 5% of the number or geometric constraint that each term precedes. For example, about 100 may mean 100+/−5. Additionally, or alternatively, substantially and/or generally orthogonal may mean that any 90-degree angle related to the described orthogonality may be between 85.5 degrees and 94.5 degrees (inclusive).

As mentioned above, cargo vehicles are used in the transportation industry for transporting many different types of cargo. Cargo vehicles include a cargo body with a floor assembly. Some conventional cargo vehicles include slide rail assemblies that are bonded to main beams that extend from the floor assembly. The main beams extend longitudinally along at least a partial length of the floor assembly and, in several embodiments, extent longitudinally along an entire length of the floor assembly. However, with slide rail assemblies that are bonded to main beams, it may be difficult to assemble slide rail assemblies with the cargo body and/or repair slide rail assemblies. Bonding main beams to floor assemblies is an expensive, time-consuming manufacturing process that is economically inefficient. Further exacerbating those economic inefficiencies, the main beams are typically made of 100s of pounds (e.g., 300 lbs) of steel, which makes them expensive to manufacture. Furthermore, trailer walls need to be short enough, such that the height of trailer (e.g., including rear wheel assemblies, slide rail assemblies, main beams extending from a floor assembly, trailer walls, etc.) do not exceed maximum height allowances (e.g., about 13.5 feet).

Accordingly, there exists a need to removably couple a slide rail assembly with a floor assembly of a cargo body. More particularly, as disclosed here, a slide rail assembly may be mounted in a manner flush with a bottom of a floor assembly. It may be appreciated by those of ordinary skill in the art that no permanent couplings are required to attach the slide rail assembly disclosed herein to the floor assembly. Therefore, slide rails can be easily repaired and/or replaced, as compared to conventional slide rails that may be bonded to a floor assembly (e.g., via main beams that extend from the floor assembly). Further, coupling slide rail assemblies flush with the bottom of the floor assembly, as disclosed herein, allows for a height of the trailer walls to be increased, while still conforming to maximum height allowances. For example, when conventional slide rail assemblies are coupled to main beams, the main beams may contribute about three inches of height to a trailer that could otherwise contribute to increasing a height of a rear end of the trailer, thereby expanding the available ingress/egress opening and/or cargo capacity.

It is with respect to these and other general considerations that embodiments have been described. Also, although relatively specific problems have been discussed, it should be understood that the embodiments should not be limited to solving the specific problems identified herein.

Aspects of the present disclosure can be advantageous to address the above problems, as well as additional problems that may be recognized by those of ordinary skill in the art. Generally, as explained herein, the present disclosure provides a floor assembly that includes a first and second side, and a slide rail assembly that includes one or more slide rails. The slide rails are removably coupled to the second side of the floor assembly. For example, the slide rails may be removably coupled such that at least a portion of the slide rail assembly is flush to the second side of the floor assembly.

In some examples, the floor assembly provided herein includes a composite floor structure. Conventional techniques for welding main beams of steel and/or slide rail assemblies onto a floor assembly may be undesirable with the advantageous composite floor structure provided herein, such as due to undesirable chemical reactions between welding heat and the composite floor structure. Accordingly, techniques provided herein for removably coupling slide rail assemblies to floor assemblies overcome the deficiencies of such conventional techniques.

In some examples, the disclosure of the present application is applicable to other vehicle types, such as truck bodies, which include side rails of a chassis frame or elevated beams rather than a slide rail. As such, a truck body may be removably coupled to the suspension system or other components of the truck assembly through the use of side rails and the connectors of the floor assembly, as disclosed herein.

Figure 2:
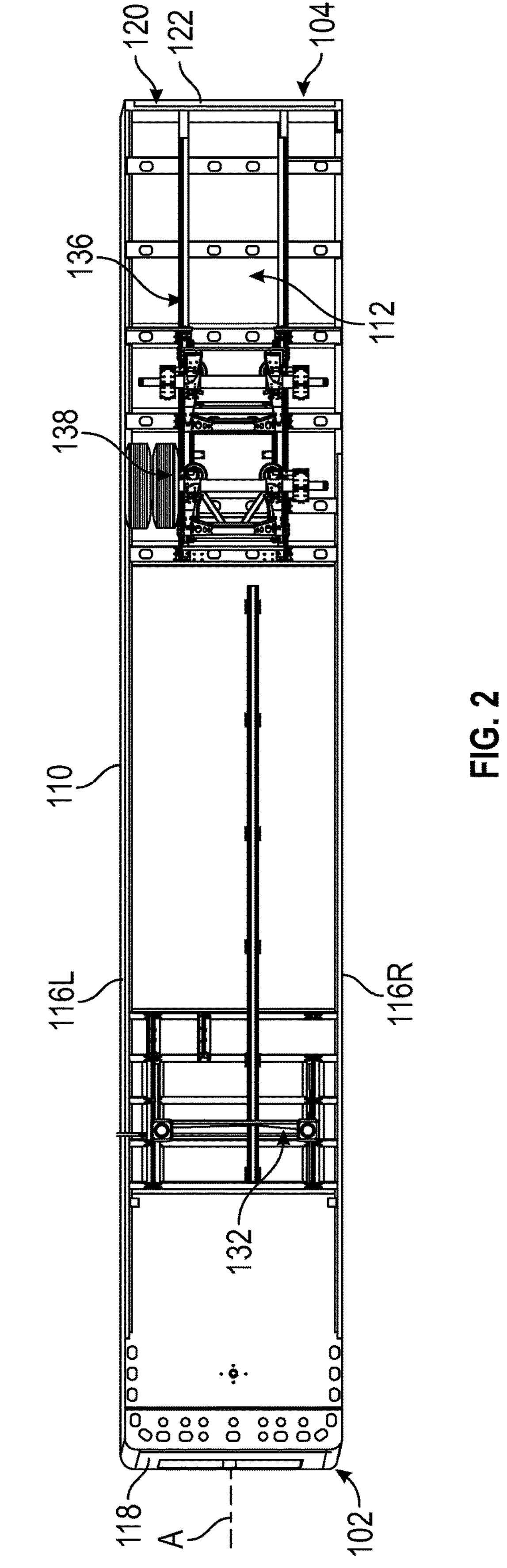
FIG. 2 illustrates a bottom plan view of the exemplary semi-trailer of FIG. 1.

FIGS. 1 and 2 illustrate an example semi-trailer 100, according to some aspects described herein. The illustrative trailer 100 extends along a longitudinal axis A from a front end 102 to a rear end 104. The illustrative trailer 100 includes a cargo body 110. The cargo body 110 includes a floor assembly 112, a roof 114, one or more sidewalls or walls 116 (e.g., a first or right sidewall 116R and a second or left sidewall 116L), a front wall or nose 118, and a rear door assembly 120 having a rear frame 122 and a door (not shown) to access the cargo body 110. The semi-trailer 100 may be used for supporting and/or transporting cargo.

In some examples, the rear end 104 may have a height that is greater than the front end 102. The roof 114 may have a uniform elevation (with respect to a ground surface along which the trailer 100 is transported), thereby creating a wedge-configuration wherein a vertical distance between the ground and the trailer 100 is larger at the front end 102 than at the rear end 104. In some examples, the roof 114 may be parallel to the floor assembly 112. However, alternatively, in some examples, such as the wedge-configuration, the roof 114 may be parallel to the ground, whereas the floor assembly 112 may extend non-parallel to the ground, with respect to the longitudinal axis A.

The wedge-configuration discussed above may be created by omitting main beams or longitudinal beams on the floor assembly 112, that may be otherwise found on conventional trailers. Generally, main beams may be used to increase the stiffness and strengthen a floor assembly of a trailer. However, the configuration of the composite floor assembly 112, as described herein, increases the stiffness and strengthen the floor assembly 112. In this way, main beams extending between the front end 102 and the rear end 104, along the floor assembly of a conventional cargo body, are not required to generate sufficient stiffness for the floor assembly 112 of the present disclosure.

The composite floor assembly 112 is stiffer than a conventional trailer floor, at least in part, due to spacing between crossmembers of the composite floor assembly 112 (e.g., transverse beams 148, discussed further herein, below). The crossmembers may be directly connected to each other. Comparatively, steel I-beam crossmembers in a conventional trailer may be spaced apart at a distance of between 10"-12". Since the individual I-beams are not directly connected to each other, there may be relatively low longitudinal stiffness for conventional floors of trailers.

Figure 4:
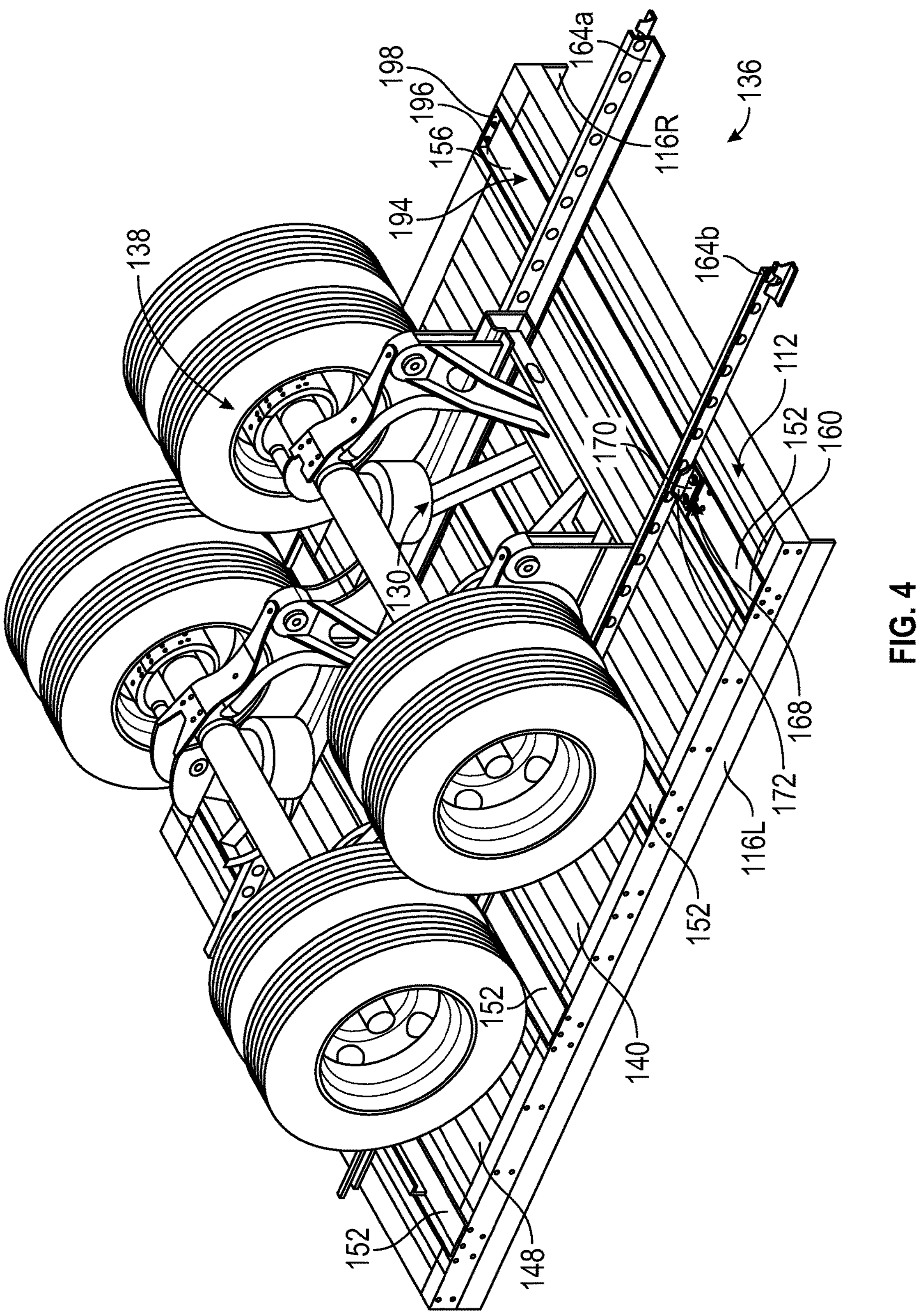
FIG. 4 illustrates a rear, bottom, and right-side isometric view of the portion of the floor assembly of FIG. 3.

The composite floor assembly 112 may also have an outer membrane on and/or around a first or bottom side 140 (see FIG. 4). The outer membrane may be made of carbon fiber. One of ordinary skill in the art will appreciate that when you consider aspects disclosed herein with respect to the composite floor assembly 112, in addition to stiffness of the walls 116L, 116R, that main beams extending longitudinally across the composite floor assembly 112 are not necessary.

It should further be appreciated that mechanisms disclosed herein are advantageous over conventional floor assemblies (e.g., of cargo van trailers) that include welding or adhesive couplings. Removable couplings, as discussed herein, do not include welding and adhesive couplings. Instead, removable couplings disclosed herein improve serviceability and repairability for a trailer (e.g., trailer 100) since a slide rail assembly may be coupled to, and decoupled from, a floor assembly (e.g., floor assembly 112), with relative ease and using removable mechanical fasteners.

By omitting the main beams, the height of the rear end 104 may be increased, relative to conventional assemblies that may otherwise include main beams. The increase in height of the rear end 104 may correspond to the height of conventional main beams. More particularly, the volume or height of the main beams on conventional trailers may accommodate or allow for increased height at the rear end 104 of trailer 100 when the main beams are removed. Omitting the main beams also may reduce the weight of the overall trailer 100. Further, it should be recognized that increasing the height of the rear end 104 of the trailer 100 provides greater cargo capacity for the trailer 100, as well as a taller rear frame 122 to improve ease of inserting and/or removing cargo from the trailer 100. Additional and/or alternative advantages may be recognized by those of ordinary skill in the art.

Moving from the front end 102 to the rear end 104, in addition to the cargo body 110, the trailer 100 also includes a coupler assembly (not shown), a suspension assembly 130 (FIG. 4), a landing gear assembly 132, a fuel tank assembly (not shown), and a slide rail assembly 136. The coupler assembly is configured to couple the cargo body 110 to a motorized tractor, chassis, or another vehicle (not shown). The landing gear assembly 132 is configured to support the cargo body 110 on the ground. The slide rail assembly 136 is configured to couple the cargo body 110 to a rear wheel assembly 138. The front end 102 of the cargo body 110 may be supported atop the tractor (not shown) via the coupler assembly (not shown) in a transport condition and further supported atop the landing gear assembly 132 in a stationary condition, and the rear end 104 of the cargo body 110 may be supported atop a front wheel assembly (not shown) in either the transport or the stationary condition.

In the illustrated example of FIG. 1, cargo body 110 of trailer 100 is an enclosed body. The cargo body 110 may be refrigerated and/or insulated to transport temperature-sensitive cargo. While the concepts of this disclosure are described in relation to a refrigerated trailer 100, it will be understood that they are equally applicable to other vehicles generally, and more specifically to dry freight trailers, flatbed trailers, small personal trailers and/or box or van trucks or truck bodies, and the like. Accordingly, those skilled in the art will appreciate that the present invention may be implemented in a number of different applications and examples and is not specifically limited in its application to the particular examples depicted herein.

Trailer 100 may have various features in common with the vehicles shown and described in International Publication No. WO 2016/137974, filed on Feb. 23, 2016, and entitled "Composite Refrigerated Truck Body and Method of Making the Same," U.S. Pat. No. 10,479,419, filed on Feb. 21, 2017, and entitled "Composite Refrigerated Semi-Trailer and Method of Making the Same," and U.S. Pat. No. 11,338,862, filed on Aug. 30, 2019, and entitled "Low-Profile Slide Rail Assembly with Embedded or Laminated Hardpoint Connectors," the complete disclosures of which are expressly incorporated herein by reference in their entirety.

The cargo body 110 of trailer 100 may be constructed, at least in part, of composite materials. For example, the floor assembly 112, roof 114, right sidewall 116R, left sidewall 116L, and/or nose 118 of cargo body 110 may be constructed of composite materials. As such, the floor assembly 112, roof 114, right sidewall 116R, left sidewall 116L, and/or nose 118 of cargo body 110 may be referred to herein as composite structures. It should be recognized that advantageous material properties of composite materials, such as strengthening properties, stiffness, reduced weight, etc., translate to the composite structure formed of the composite materials described herein.

Composite materials are generally formed by combining two or more different constituents that remain separate and distinct in the final composite material. Exemplary composite materials for use in the composite cargo body 110 include fiber-reinforced plastics (FRP), for example carbon-fiber-reinforced plastics (CRP). Each composite structure may be a single, unitary component, which may be formed from a plurality of constituents or layers permanently coupled together. Other elements of the cargo body 110 may be constructed of non-composite (e.g., metallic) materials. For example, the rear door assembly 120 of the cargo body 110 may be constructed of metallic materials.

The composite construction of the cargo body 110 may present certain advantages. First, because the composite structures may lack structural metallic components, the composite cargo body 110 may have a reduced heat loss coefficient (Ua) and improved thermal efficiency. Also, the composite cargo body 110 may operate to minimize outgassing of blowing agents, minimize air loss, and minimize water intrusion. Additionally, the composite cargo body 110 may be lighter in weight than a typical metallic cargo body, which may improve fuel efficiency. Further, the composite cargo body 110 may have fewer metallic structures than a typical cargo body, which may make the cargo body 110 less susceptible to corrosion. Also, the composite cargo body 110 may include fewer parts than a typical metallic cargo body, which may simplify construction, reduce inventory, and reduce variation in manufacturing. Further, the composite cargo body 110 may be suitable for use with sensitive cargo, including foodstuffs, because the composite materials may be inert to avoid reacting with the cargo and other materials and because the composite materials may be easy to clean and maintain to ensure proper hygiene. As a result, the composite cargo body 110 may qualify as "food grade" equipment.

The composite structures of the present disclosure may contain one or more structural supports or preforms. The preform may have a structural core that has been covered with an outer fabric layer or skin. The outer skin may be stitched or otherwise coupled to the underlying core and/or any surrounding layers. The core may be extruded, pultruded, or otherwise formed into a desired shape and cut to a desired length. In some examples, the core is a polyurethane foam material or another foam material, and the outer skin is a non-woven spun bond polyester material, a fiberglass fabric, or another suitable material. Advantageously, in addition to its structural effect, the foam core may have an insulating effect in certain applications, including refrigerated trucking applications. Exemplary preforms include PRISMA® preforms provided by Compsys, Inc. of Melbourne, Florida.

Both the core and the outer skin of the preform may be selected to accommodate the needs of the particular application. For example, in areas of the final structure requiring more strength and/or insulation, a low-density foam may be replaced with a high-density foam or a hard plastic block. The individual preforms may also be sized, shaped, and arranged in a manner that accommodates the needs of the particular application. For example, in areas of the final structure requiring less strength, the preforms may be relatively large in size, with the foam cores spanning relatively large distances before reaching the surrounding outer skins. By contrast, in areas of the final structure requiring more strength, the preforms may be relatively small in size, with the foam cores spanning relatively small distances before reaching the surrounding outer skins. Stated differently, the preforms may be shaped as relatively wide panels in areas of the final structure requiring less strength and as relatively narrow support beams in areas of the final structure requiring more strength.

The composite structures of the present disclosure may also contain one or more reinforcing materials or layers around the preforms. Each reinforcing layer may contain reinforcing fibers and may be capable of being impregnated and/or coated with a resin. Suitable fibers include carbon fibers, glass fibers, cellulose, or polymers, for example. The fibers may be present in fabric form, which may be mat, woven, non-woven, or chopped, for example. Exemplary reinforcing layers include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Such fabrics are commercially available from Vectorply Corporation of Phenix City, Alabama. Exemplary fabrics include the E-LM 1810 fiberglass fabric with 0° unidirectional fibers, the E-LTM 3610 fiberglass fabric with 0°/90° fibers, and the E-LTM 2408 fiberglass fabric with 0°/90° fibers, for example.

According to some examples of the present disclosure, a plurality of different reinforcing layers may be stacked together and used in combination. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing layers may be stitched or otherwise coupled together to simplify manufacturing, to ensure proper placement, and to prevent shifting and/or bunching.

Figure 3:
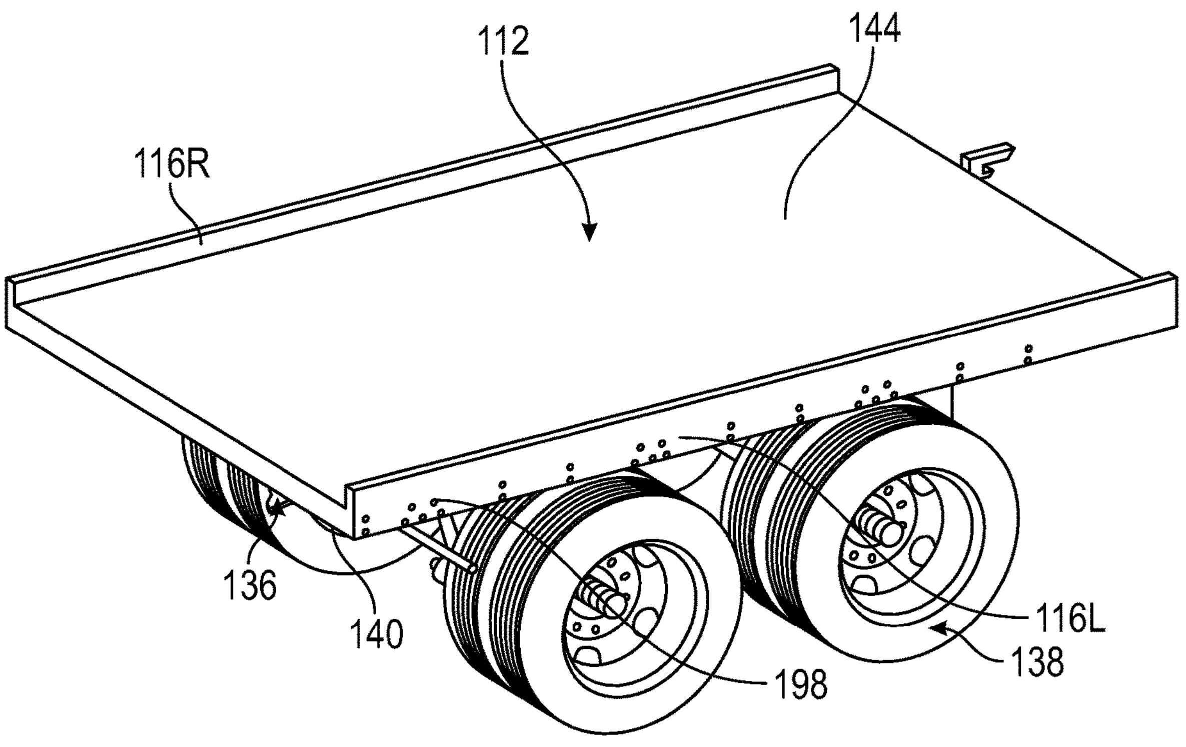
FIG. 3 illustrates a front, top, and left-side isometric view of a portion of a floor assembly, according to some aspects described herein.

FIG. 3 illustrates a front, top, and left-side isometric view of at least a rear portion of the floor assembly 112, the slide rail assembly 136, and the rear wheel assembly 138, according to some aspects described herein. The slide rail assembly 136 is coupled to the floor assembly 112, as will be described in further detail herein. Further, the rear wheel assembly 138 is coupled to the slide rail assembly 136. The rear wheel assembly 138 may be coupled to the slide rail assembly 136 using mechanisms that may be recognized by those of ordinary skill in the art (e.g., sliding the rear wheel assembly along the slide rail assembly and fastening the rear wheel assembly into one of a plurality of positions).

The illustrative floor assembly 112 of FIGS. 3-9 is a rear portion of the floor assembly 112. The floor assembly 112, in its entirety, may extend, up to, the longitudinal length of the trailer 100, as measured with respect to the longitudinal axis A (see FIG. 1). Additionally, or alternatively, the floor assembly 112 may extend up to a portion of the longitudinal length of the trailer 100, as measured with respect to the longitudinal axis A.

The illustrative floor assembly 112 includes the first or bottom side 140 (see FIG. 4) that faces downwardly toward the ground when in use. The illustrative floor assembly 112 also includes an upper or top side 144 that faces upwardly when in use to support cargo or other objects. The illustrative floor assembly 112 has a generally rectangular outer perimeter, although this shape may vary. The floor assembly 112 may be a composite structure that is constructed, at least in part, of composite materials and as disclosed herein. The right sidewall 116R and the left sidewall 116L of the trailer 100 extend generally orthogonal to the top side 144 and the bottom side 140 of the floor assembly 112.

FIG. 4 illustrates a rear, bottom, and right-side isometric view of the floor assembly 112 and the slide rail assembly 136. The floor assembly 112 includes a plurality of transverse beams 148. The transverse beams 148 may be composite structures. The transverse beams 148 extend substantially orthogonal to the longitudinal axis A of the trailer 100 (FIG. 1). Alternatively, in some examples, the transverse beams 148 may extend substantially parallel to the longitudinal axis A, or may otherwise extend at some angle of between substantially parallel and substantially orthogonal, with respect to the longitudinal axis A. Further, the transverse beams 148 may each be filled with a foam material.

The cargo body 110 includes one or more channels or crossmembers 152. The one or more channels 152 are coupled to the floor assembly 112, on the bottom side 140. The channels 152 may be comprised of a metal, such as, for example steel. The channels 152 include a first lateral side 156 and a second lateral side 160 that is opposite of the first lateral side 156, across a length of the channel. A perimeter of the channels 152 is generally rectangular, such that the channels 152 each form an elongate structure that is elongated from the first lateral side 156 to the second lateral side 160. The one or more channels 152 may extend along the same direction as each of the plurality of beams 148 (e.g., substantially orthogonal to the longitudinal axis A). Additionally, or alternatively, the channels 152 may be otherwise sized or shaped, as desired by one of ordinary skill in the art, for a specific application. The channels 152 are discussed in further detail with respect to FIGS. 7 and 9.

As discussed above, slide rail assembly 136 may be used to couple the cargo body 110 to the rear wheel assembly 138. The slide rail assembly 136 includes one or more slide rails 164, such as a first slide rail 164*a* and a second slide rail 164*b*. The slide rails 164 are oriented generally orthogonal to the transverse beams 148 (e.g., extend in a direction coaxial with the longitudinal axis A). The one or more slide rails 164 are removably coupled to the bottom side 140 of the floor assembly 112. The slide rails 164 are removably coupled flush to the bottom side 140 of the floor assembly 112. For example, the slide rails 164 may be coupled to the floor assembly 112, such that the slide rails 164 are in direct contact with the bottom side 140 of the floor assembly 112. In this way, at least an upper extent of the slide rails 164 is directly in contact with and generally mounted at the same vertical height as a bottom extent of bottom side 140 of the floor assembly 112.

It may be appreciated by those of ordinary skill in the art that no permanent couplings (e.g., welding, molding, etc.) are required to attach the slide rail assembly 136 to the floor assembly 112. Therefore, the slide rails 164 can be easily maintained and/or replaced, as compared to conventional slide rails that may be bonded to a floor assembly (e.g., via main beams that extend from the floor assembly). Further, coupling the slide rails 164 flush to the bottom side 140 of the floor assembly 112 allows for a height of the trailer walls 116, at the rear of the trailer 100, to be increased, relative to examples where slides rails 164 are not flush to a floor assembly, while still conforming to maximum height allowances of a trailer (e.g., as defined by local, state, or federal guidelines, such as, a guideline of 13.5 feet, as measured vertically from a ground to a top of a trailer).

Instead of permanently coupling the slide rail assembly 136 to the floor assembly 112, the slide rail assembly 136 is removably coupled to the floor assembly 112 via one or more brackets 168. Specifically, the slide rails 164 are coupled to the floor assembly 112 via the brackets 168 and mechanical and removeable fasteners (e.g., nuts and bolts). It should be appreciated that the slide rail assembly 136 may otherwise be removably coupled to the floor assembly 112, for example via conventional removable fasteners extending directly through an aperture within the slide rails 164 and through an aperture of the floor assembly 112. Alternatively or additionally, snappable attachment, slidable attachment, etc. may be used to couple together the slide rail assembly 136 and the floor assembly 112.

Each of the brackets 168 include at least one horizontal portion 170 and at least one vertical portion 172. The vertical portion 172 may extend substantially orthogonal to the horizontal portion 170, as well as to the bottom side 140 of the floor assembly 112. In some examples, the horizontal portion 170 of each of the brackets 168 is mechanically coupled to the channels 152. In some examples, the brackets 168 are directly coupled to the channels 152. In some examples, the brackets 168 are coupled to the channels 152, via one or more intermediary brackets (e.g., the horizontal portion 170 and/or the vertical portion 172 may be coupled to at least one of the one or more intermediary brackets). For example, the one or more intermediary brackets may be coupled to the channels 252 (e.g., permanently coupled and/or removably coupled) and located inside the channels 252 and/or outside of the channels 252, such that coupling the brackets 168 to the intermediary brackets thus couples the one or more brackets 168 to the channels 152. The one or more intermediary brackets may be straight brackets, curved brackets, and/or have configurable dimensions desirable for particular use cases that may be recognized by those of ordinary skill in the art. The lower or bottom surface/wall of channel 152 (FIG. 7) may be coupled to one or more of a plurality of connectors 176 embedded in a laminate around the transverse beams 148, as described further herein and illustrated with respect to FIG. 8.

Figure 8:
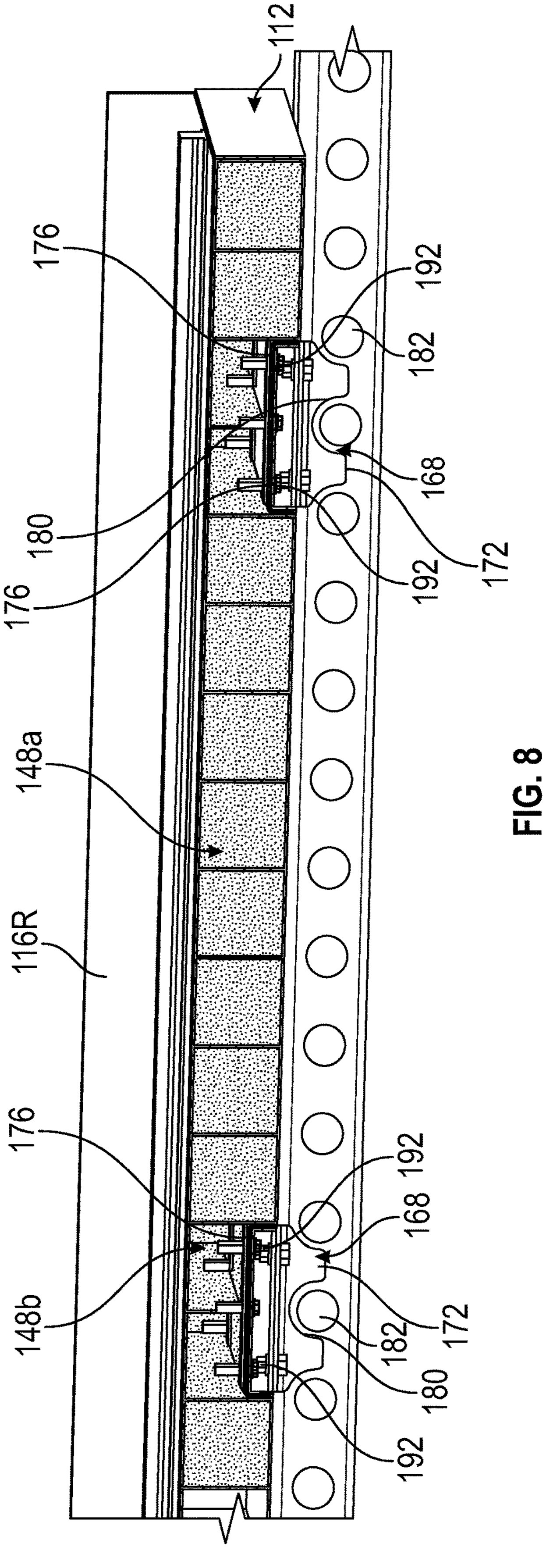
FIG. 8 illustrates a cross-sectional perspective view of the portion of the floor assembly of FIG. 5 showing one or more embedded connectors.

Referring now to FIG. 8, the lower surface/wall of each of the channels 152 may be coupled to at least one of the brackets 168 to couple the slide rails 164 to the floor assembly 112. The vertical portion 172 is coupled to the slide rails 164. It should be understood that the vertical portion 172 can be permanently or removably coupled to the slide rails 164, while still allowing the slide rails 164 to be removably coupled to the floor assembly 112 (e.g., because of the mechanical couplings through the horizontal portions 170 of the brackets 168).

To remove the slide rails 164, the mechanical couplings between the brackets 168 and the floor assembly 112 may be unfastened to detach the slide rails 164 from the floor assembly 112. Accordingly, maintenance can easily be performed on the slide rails 164, as compared to conventional slide rails that may be permanently bonded to floor assemblies.

Figure 5:
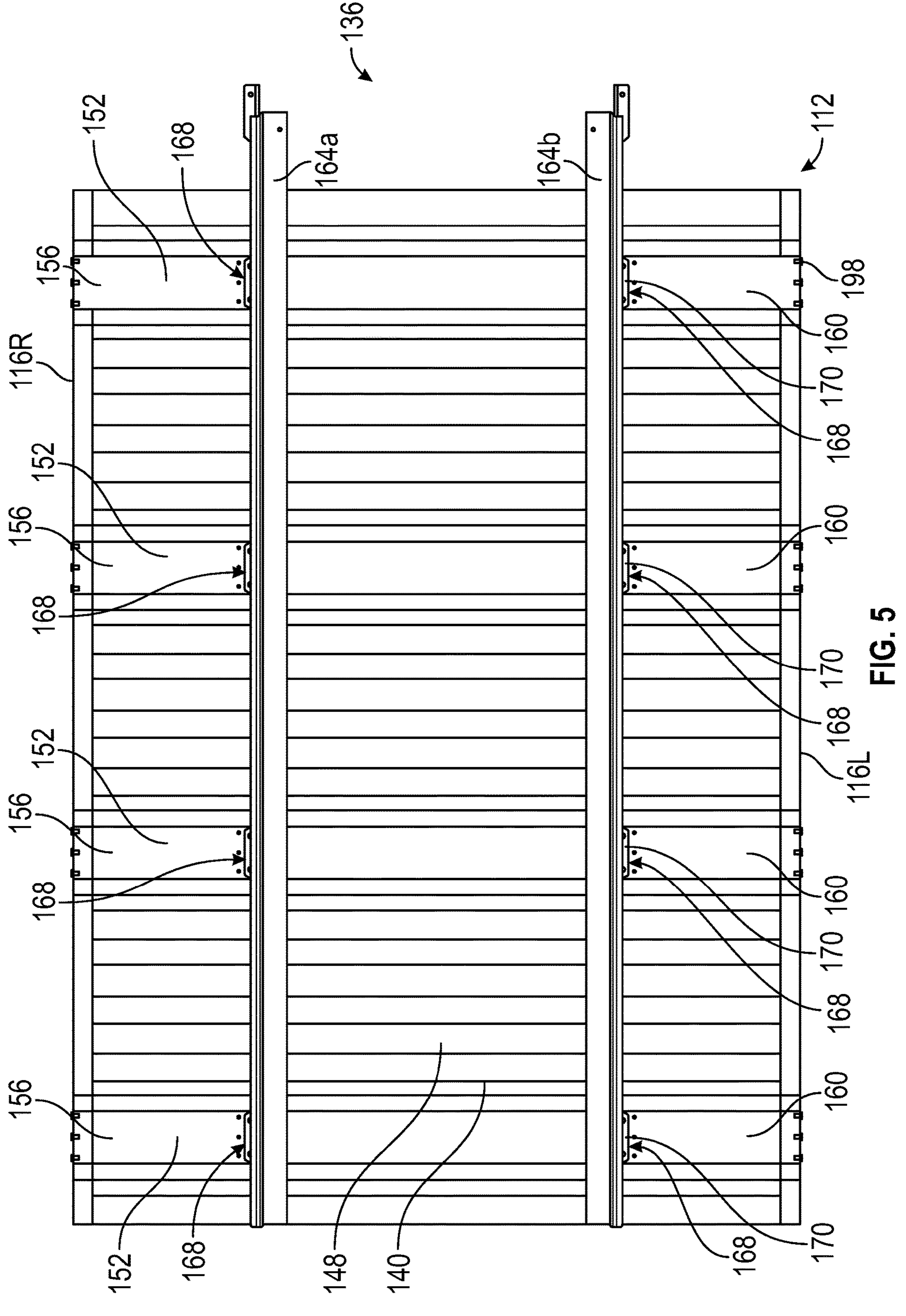
FIG. 5 illustrates a bottom plan view of a portion of a floor assembly, according to some aspects described herein.

FIG. 5 illustrates a bottom plan view of the floor assembly 112, according to some aspects described herein. A width of each of the channels 152 (e.g., as measured along the longitudinal axis A) may be wider than a width of each of the transverse beams 148 (e.g., also as measured along the longitudinal axis A). The channels 152 may be uniformly spaced across at least a portion of the floor assembly 112. Additionally, or alternatively, the channels may be non-uniformly spaced across at least a portion of the floor assembly 112. Further, the width of the channels 152 may be narrower than a width of each of the transverse beams 148, such as at a region of the floor assembly at which a landing gear may be coupled.

In some examples, the channels 152 may be spaced apart by a distance of about 20 inches, or about 30 inches, or about 40 inches, or about 50 inches, or about 60 inches, or any distance within any range defined by any of the foregoing values. Alternatively, in some examples, the channels 152 may be spaced apart at a configurable distance that is determined to be desirable by one of ordinary skill in the art for a particular application.

As shown in FIG. 5, the channels 152 extend from the first wall 116R of the trailer 100 to the second wall 116L of the trailer 100. Additionally, the transverse beams 148 extend between the first wall 116R of the trailer 100 and the second wall of the trailer 100. The channels 152 may be fastened into the first wall 116R and the second wall 116L, as will be discussed further, with respect to FIG. 9.

Figure 6:
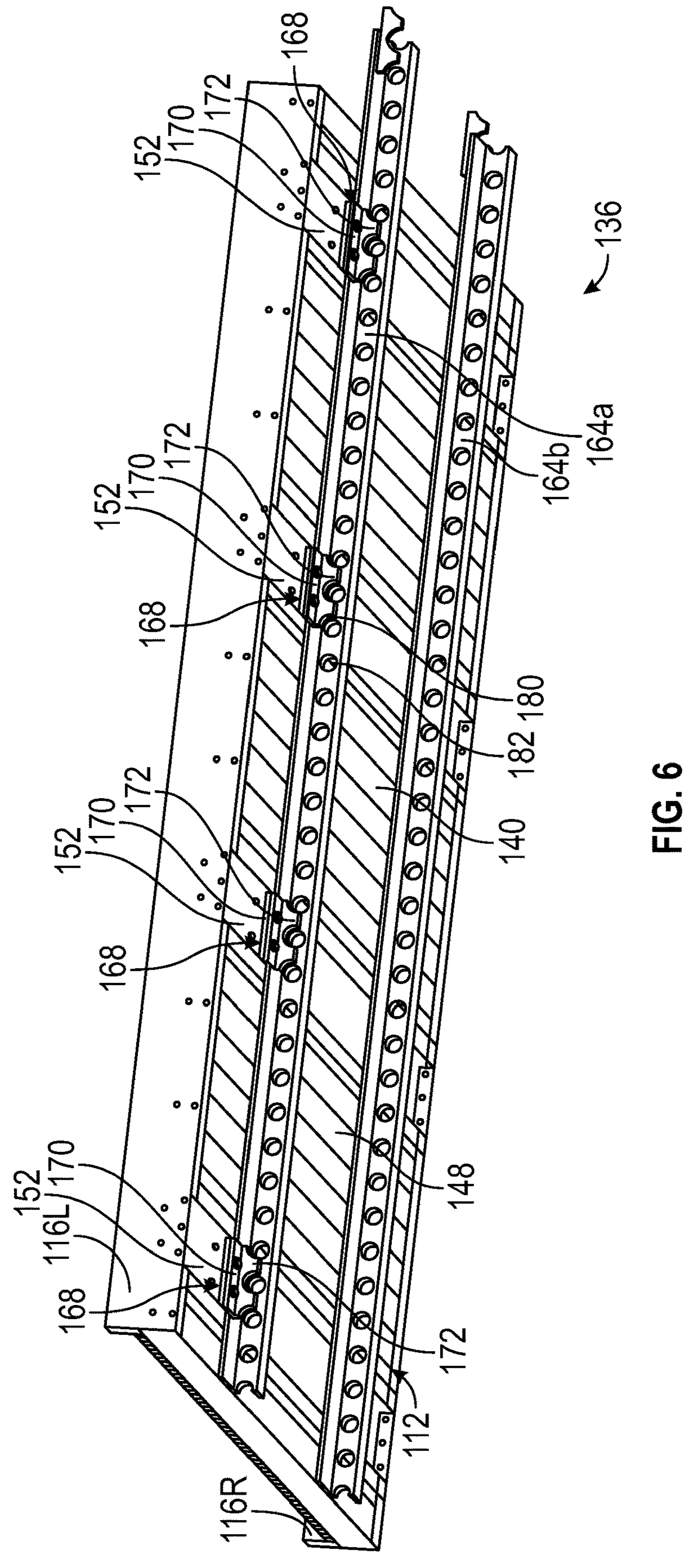
FIG. 6 illustrates a bottom and front perspective view of the portion of the floor assembly of FIG. 5.

FIG. 6 illustrates a bottom and front perspective view of the floor assembly of FIG. 5. The vertical portion 172 of the brackets 168 may include one or more bracket cutouts 180 that are sized to correspond to one or more rail cutouts 182 in the slide rails 164. The bracket cutouts 180 and the rail cutouts 182 may be circles, squares, ovals, or any other shape. Further, the bracket cutouts 180 and the rail cutouts 182 may be similarly sized such that the rear wheel assembly 138 can be fastened to the slide rails 164 (e.g., via one or more fasteners, such as a pin, bolt, screw, rivet, etc.), without interference from the brackets 168.

In some examples, the brackets 168 may be disposed between the slide rails 164*a*, 164*b*. Alternatively, in some examples, the brackets may be disposed outside of the slide rails 164*a*, 164*b*. The brackets 168 are disposed on the channels 152 between adjacent transverse beams 148 of the same height.

Figure 7:
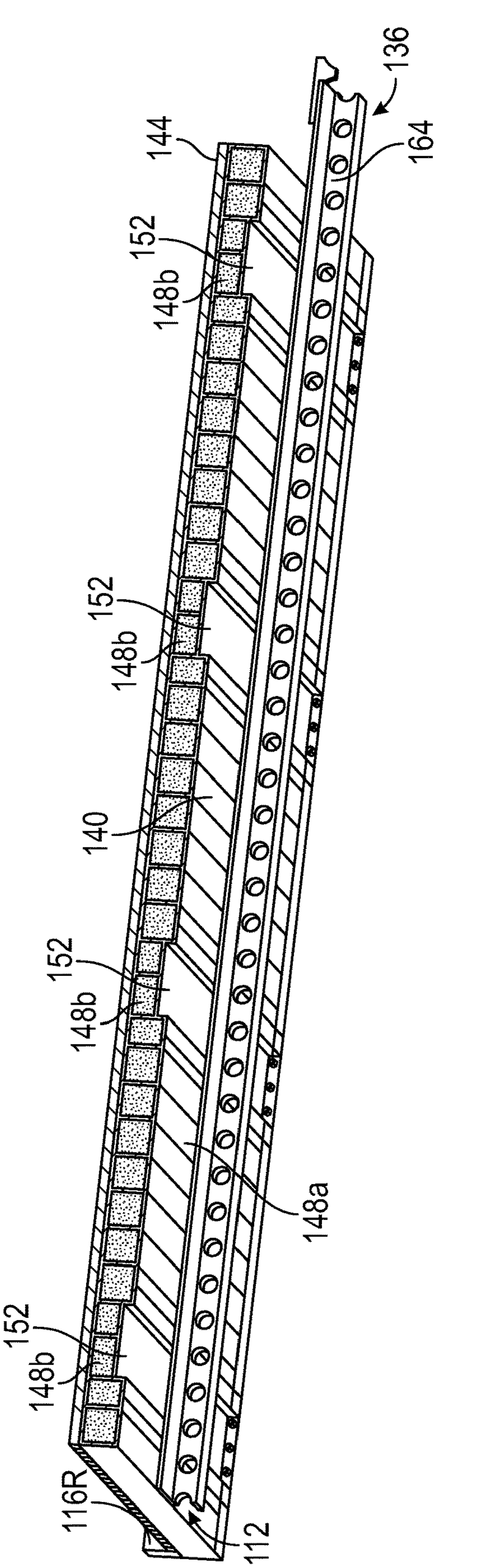
FIG. 7 illustrates a bottom and front cross-sectional perspective view of the portion of the floor assembly of FIG. 5.

FIG. 7 illustrates a bottom and front cross-sectional perspective view of the floor assembly 112. The floor assembly 112 includes a plurality of transverse composite beams 148. Illustratively, each of the plurality of transverse composite beams 148 is oriented generally orthogonal to the longitudinal axis A. More specifically, each of the plurality of transverse composite beams 148 extends in a direction substantially orthogonal to the longitudinal axis A between the right sidewalls 116R and the left sidewall 116L, respectively. The individual transverse composite beams 148 may be constructed in accordance with teachings described herein regarding composite materials. Specifically, each transverse composite beams 148 may be a preform of a structural foam core wrapped in an outer skin.

The plurality of transverse composite beams 148 include a first subset of transverse beams 148*a* that correspond to tall transverse beams and a second subset of transverse beams 148*b* that correspond to short transverse beams. The tall transverse beams 148*a* are taller than the short transverse beams 148*b*, with respect to the sidewalls 116R, 116L of the trailer 100 (e.g., or, similarly, with respect to a ground on which the trailer 100 may travel). Illustratively, an upper extent of the transverse beams 148 are generally flush with each other and directly adjacent upper surface 144 of the floor assembly 112. Conversely, the lower extent of the transverse beams 148 may be positioned at different vertical heights relative to each other. While the lower extent of the transverse beams 148 define the bottom surface 140 of the floor assembly 112, the bottom surface 140 may have a variable height due to the configuration of the transverse beams 148. More particularly, the bottom side 140 of the floor assembly 112 may be defined across both the transverse beams 148*a* and the short transverse beams 148*b*. Therefore, the one or more channels 152 are coupled to the floor assembly 112, on the bottom side 140 generally at the location of the short transverse beams 148*b*. The one or more channels 152 are disposed between the top side 144 of the trailer 100 and at least a portion of the bottom side 140 of the trailer 100 in that the channels 152 may be directly coupled to the lower extent of beams 148*b* while the lower extent of the beams 148*a* extend vertically below the channel 152 due to the differences in height between the beams 148*a*, 148*b*. For example, at least a portion of the channel 152 is entirely between the top side 144 and the bottom side 140 formed by the transverse beams 148*a*.

The individual transverse composite beams 148 may be sized, shaped, and arranged in a manner that accommodates the needs of a particular application. For example, a relatively large number of small, closely-spaced beams may be used for high-weight/high-strength applications, whereas a relatively small number of large and/or spaced-apart beams may be used for low-weight/low-strength applications.

FIG. 8 illustrates a cross-sectional perspective view of the floor assembly 112 showing the one or more embedded hardpoint connectors 176. In some examples, the floor assembly 112 includes the embedded hardpoint connectors 176. The connectors 176 may serve as fasteners or anchors for mechanically coupling components of trailer 100 to floor assembly 112, such as rear door assembly 120 (FIG. 1), a coupler assembly (not shown), landing gear assembly 132 (FIGS. 1 and 2), a fuel tank assembly (not shown), a suspension assembly (FIG. 4), and/or the slide rail assembly 136. Additional and/or alternative components that may be mechanically coupled to the floor assembly 112 may be recognized by those of ordinary skill in the art.

Each connector 176 may be configured to receive one or more mechanical fasteners 192 from an adjacent component, such as the channel 152. Suitable mechanical fasteners 192 include bolts, screws, rivets, and nails, for example. In some examples, the connectors 176 include pre-tapped holes (not shown) that are sized and configured to receive the mechanical fasteners 192. Mechanical fasteners 192 may be desired, as opposed to adhesives, to facilitate efficient and inexpensive assembly and repairs of trailer 100.

In FIG. 8, connectors 176 are illustratively embedded in a select group of beams of the plurality of transverse beams 148. The beams 148 may be composite beam. In one embodiment, the connectors 176 are embedded in laminate outside of the beams 148 of the second subset of the plurality of beams 148. The laminate outside of the beams 148 may be between the beams 148 themselves and an adjacent layer of glass or carbon that form, at least in part, a total laminate layup. The remaining beams 148 (e.g., the first subset of beams 148) may lack embedded connectors 176. One or more beams 148 lacking embedded connectors 176 may be arranged between the beams 148 having embedded connectors 176 (e.g., in adjacent laminate), such that the connectors 176 are longitudinally spaced apart along the cargo body 110.

Illustratively, connectors 176 are embedded generally adjacent to or in the bottom side 140 of composite floor 112, more specifically within laminate outside of the beams 148. Additionally, or alternatively, in some examples, the connectors 176 are embedded in another surface of the floor assembly 112 or span two or more surfaces of beams 148. The connectors 176 may be substantially planar, C-shaped, T-shaped, pi-shaped, bent, tubular, or other suitable shapes.

The connectors 176 may be constructed of metallic materials (e.g., steel, aluminum, titanium), polymeric materials, wood, or composite materials. In some examples, the connectors 176 are constructed of materials which are dissimilar from the composite material used to construct the corresponding beams. The connectors 176 may be fabricated by extrusion, pultrusion, sheet forming, roll forming, and/or casting, for example. The connectors 176 may also be single-piece or multi-piece constructs. For multi-piece constructs, the pieces may be welded, mechanically fastened, adhered, snap-fit, or otherwise coupled together.

Figure 9:
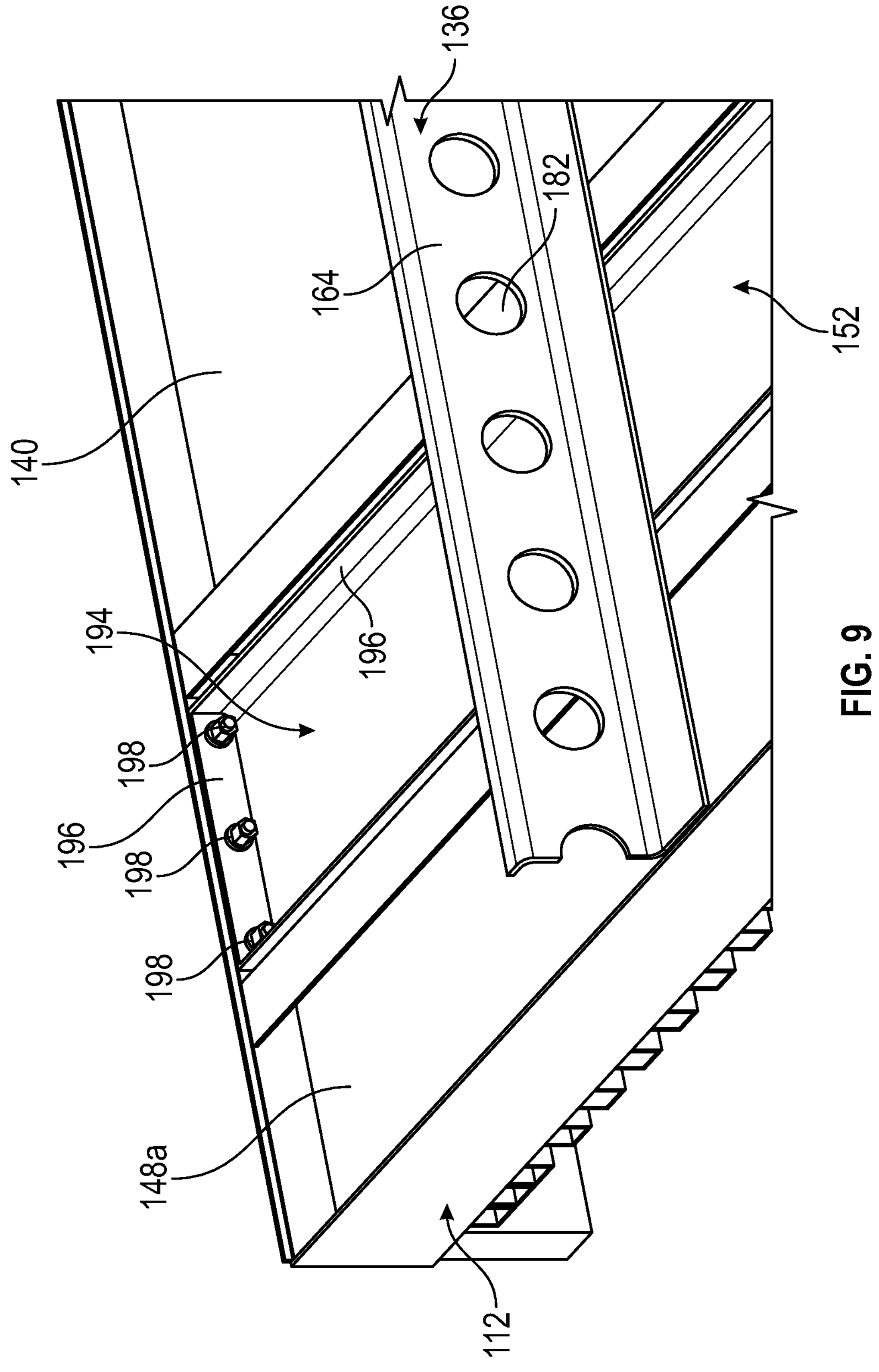
FIG. 9 illustrates an enlarged version of a portion of a top, front, and left side perspective view of the portion of the floor assembly of FIG. 5.

FIG. 9 illustrates an enlarged version of a portion of a top, front, and left side perspective view of the floor assembly 112. As shown in FIG. 9, the first lateral side of the channel 152 is fastened into the right wall 116R of the trailer 100. The channel 152 defines a depressed planar region 194 and channel sidewalls 196 that curve or otherwise extend generally orthogonally from the depressed planar region 194.

The channel sidewalls 196 may each extend from a respective one of four sides of the depressed planar region 194. Accordingly, one or more channel fasteners 198 may extend through one of the channel sidewalls 196 and into the right sidewall 116R of the trailer 100 to mechanically fasten the channel 152 to the right sidewall 116R. The second lateral end 160 of the channel 152, opposite of the first lateral end 156, may be similarly fastened into the left sidewall 116L of the trailer 100.

Figure 10:
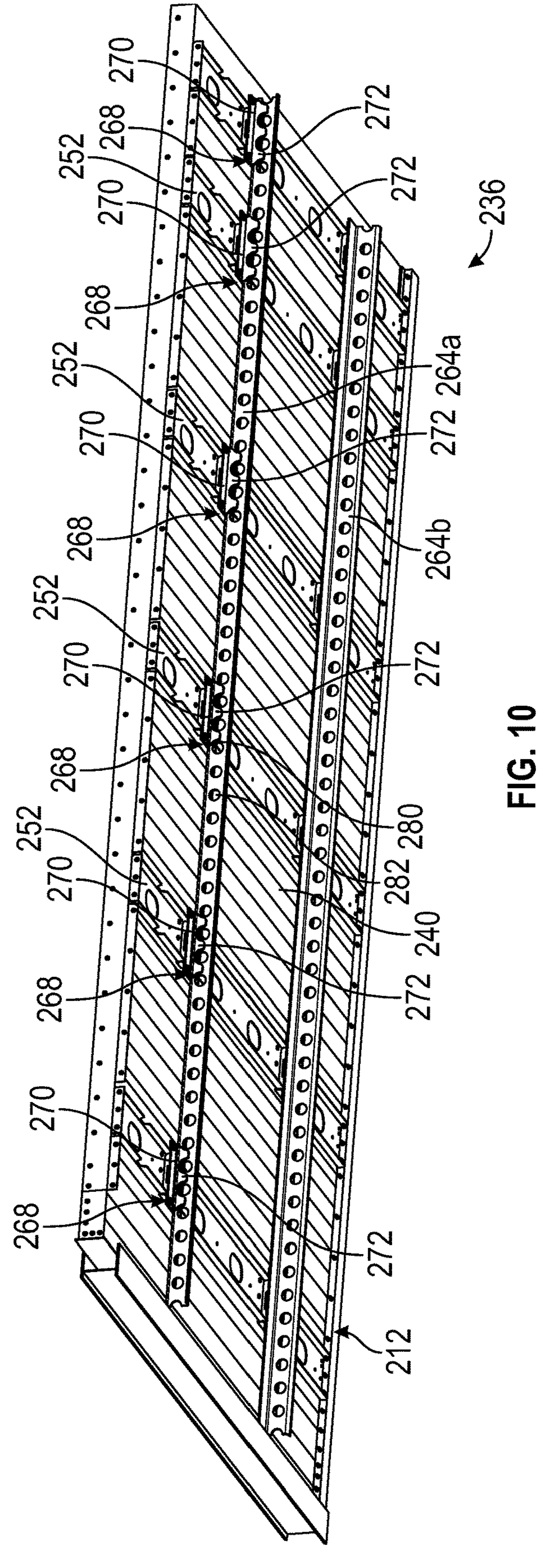
FIG. 10 illustrates a bottom and front perspective view of the portion of a floor assembly, according to some aspects described herein.

FIG. 10 illustrates a bottom and front perspective view of a floor assembly 212 according to some aspects provided herein. The floor assembly 212 may be similar to the floor assembly 112, except as otherwise noted. For example, components of floor assembly 112 that are the same or similar as components of the floor assembly 212 may be similarly numbered, except for being incremented by 100 (e.g., 164 incremented to 264).

In some examples, the floor assembly 212 may be part of the example semi-trailer 100 described earlier herein with respect to FIGS. 1 and 2. For example, the floor assembly 212 may be used instead of the floor assembly 112.

The composite floor assembly 212 is stiffer than a conventional trailer floor, at least in part, due to spacing between crossmembers of the composite floor assembly 212 (e.g., transverse beams 248, discussed further herein, below). The crossmembers may be directly connected to each other. Comparatively, steel I-beam crossmembers in a conventional trailer may be spaced apart at a distance of between 10"-12". Since the individual I-beams are not directly connected to each other, there may be relatively low longitudinal stiffness for conventional floors of trailers.

The composite floor assembly 212 may also have an outer membrane on and/or around a first or bottom side 240. The outer membrane may be made of carbon fiber. One of ordinary skill in the art will appreciate that when you consider aspects disclosed herein with respect to the composite floor assembly 212, in addition to stiffness of the walls 116L, 116R, that main beams extending longitudinally across the composite floor assembly 212 are not necessary.

It should further be appreciated that mechanisms disclosed herein are advantageous over conventional floor assemblies (e.g., of cargo van trailers) which rely on permanent connections, for example through welding or adhesive couplings. Removable couplings (e.g., fastener connections), as discussed herein, do not include welding and adhesive couplings. Instead, removable couplings disclosed herein improve serviceability and repairability for a trailer (e.g., trailer 100) since a slide rail assembly may be coupled to, and decoupled from, a floor assembly (e.g., floor assembly 212), with relative ease and using removable mechanical fasteners and without any permanent damage to the floor assembly 212 and/or the slide rail assembly.

In some examples, a coupler assembly (not shown), a suspension assembly 130 (FIG. 4), a landing gear assembly 132, a fuel tank assembly (not shown), and/or a slide rail assembly 236 may be coupled to the floor assembly 212. The floor assembly 216 may be constructed of composite materials. As such, the floor assembly 212 may be referred to herein as a composite structure. It should be recognized that advantageous material properties of composite materials, such as strengthening properties, stiffness, reduced weight, etc., translate to the composite structure formed of the composite materials described herein. Further details regarding composite structures in accordance with aspects of the present disclosure are provided earlier herein.

Figure 11:
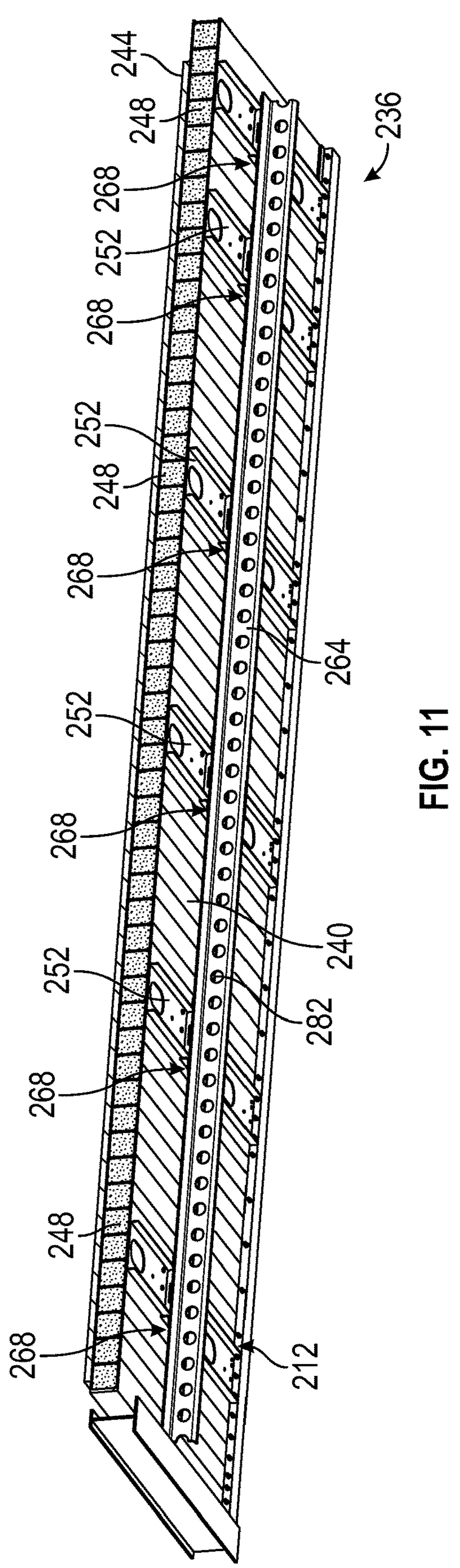
FIG. 11 illustrates a bottom and front cross-sectional perspective view of the portion of the floor assembly of FIG. 10.
Figure 12:
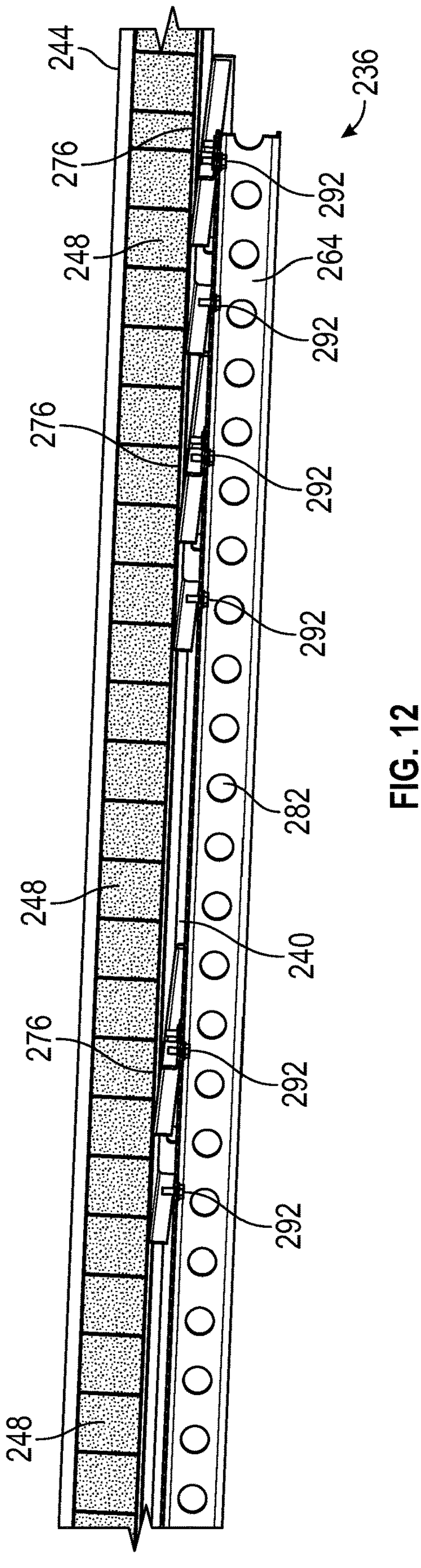
FIG. 12 illustrates a cross-sectional perspective view of the portion of the floor assembly of FIG. 10 showing one or more embedded connectors.

The illustrative floor assembly 212 of FIGS. 10-12 is a rear portion of the floor assembly 212. The floor assembly 212, in its entirety, may extend, up to, the longitudinal length of the trailer 100, as measured with respect to the longitudinal axis A (see FIG. 1). Additionally, or alternatively, the floor assembly 212 may extend up to a portion of the longitudinal length of the trailer 100, as measured with respect to the longitudinal axis A.

The illustrative floor assembly 212 includes the first or bottom side 240 that faces downwardly toward the ground when in use. The illustrative floor assembly 112 also includes an upper or top side 244 that faces upwardly when in use to support cargo or other objects. The illustrative floor assembly 212 has a generally rectangular outer perimeter, although this shape may vary. The floor assembly 212 may be a composite structure that is constructed, at least in part, of composite materials and as disclosed herein. The right sidewall 116R and the left sidewall 116L of the trailer 100 may extend generally orthogonal to the top side 244 and the bottom side 240 of the floor assembly 212.

The floor assembly 212 includes a plurality of transverse beams 248. The transverse beams 248 may be composite structures. The transverse beams 248 extend substantially orthogonal to the longitudinal axis A of the trailer 100 (FIG. 1). Alternatively, in some examples, the transverse beams 248 may extend substantially parallel to the longitudinal axis A, or may otherwise extend at some angle of between substantially parallel and substantially orthogonal, with respect to the longitudinal axis A. Further, the transverse beams 248 may each be filled with a foam material.

In some examples, the cargo body 110 includes one or more channels or crossmembers 252. In some examples, the slide rail assembly 236 includes the one or more channels or crossmembers 252. The one or more channels 252 are coupled to the floor assembly 212, on the bottom side 240. The channels 252 may be comprised of a metal, such as, for example steel. The channels 252 may be the same as or similar to the channels 152 described earlier herein with respect to floor assembly 112.

The slide rail assembly 236 may be used to couple the cargo body 110 to the rear wheel assembly 138. The slide rail assembly 236 includes one or more slide rails 264, such as a first slide rail 264*a* and a second slide rail 264*b*. In the illustrative embodiment, the slide rails 264 are oriented generally orthogonal to the transverse beams 248 (e.g., extend in a direction coaxial with the longitudinal axis A). The one or more slide rails 264 are removably coupled to the bottom side 240 of the floor assembly 212. In some examples, at least a portion of the slide rail assembly 236 is coupled flush to the floor assembly 212. For example, the channels 252, which may be part of the slide rail assembly 236, may be coupled flush to the bottom side 240 of the floor assembly 212 such that the uppermost surface of the channels 252 are generally at the same height relative to the ground surface as the bottom side 240 of the floor assembly 212. Generally, two components are flush if at least a portion of the two components are at the same level (e.g., displacement from a reference point), such that a place (e.g., surface) at which the at least a portion of the two components meet is flat. In some examples, the slide rails 264 may be coupled to the floor assembly 212, such that the slide rails 264 are in contact (e.g., direct contact) with the channels 252, and the channels 252 are in contact (e.g., direct contact) with the bottom side 240 of the floor assembly 212. In this way, at least an upper extent of the channels 252 are directly in contact with and generally mounted at the same vertical height as a bottom extent of bottom side 240 of the floor assembly 212.

It may be appreciated by those of ordinary skill in the art that no permanent couplings (e.g., welding, molding, etc.) are required to attach the slide rail assembly 236 (e.g., the channels 252, the slide rails 264) to the floor assembly 212. Therefore, the slide rails 264 can be easily maintained and/or replaced, as compared to conventional slide rails that may be bonded to a floor assembly (e.g., via main beams that extend from the floor assembly). Further, coupling the slide rails 264 to the channels 252 that are flush to the bottom side 240 of the floor assembly 212 allows for a height of the trailer walls 116, at the rear of the trailer 100, to be increased, relative to examples where slides rails 264 are coupled to a floor assembly via other intermediary components (e.g., channels, main beams, etc.), while still conforming to maximum height allowances of a trailer (e.g., as defined by local, state, or federal guidelines, such as, a guideline of 13.5 feet, as measured vertically from a ground to a top of a trailer).

Instead of permanently coupling the slide rail assembly 236 to the floor assembly 212, the slide rail assembly 236 is removably coupled to the floor assembly 212. For example, the channels 252 may be removably coupled to the floor assembly 212, such as via removeable fasteners (e.g., nuts and bolts). In some examples, the slide rails 264 may be removably coupled to the channels 252, such as via one or more brackets 268. It should be appreciated that the slide rail assembly 236 and/or the channels 252 may otherwise be removably coupled to the floor assembly 212, for example via conventional removable fasteners extending directly through an aperture within the slide rails 264 and through an aperture of the floor assembly 212. Alternatively or additionally, snappable attachment, slidable attachment, etc. may be used to couple together the slide rail assembly 236, the channels 252, and/or the floor assembly 212.

Each of the brackets 268 include at least one horizontal portion 270 and at least one vertical portion 272. The vertical portion 272 may extend substantially orthogonal to the horizontal portion 270, as well as to the bottom side 240 of the floor assembly 212. In some examples, the horizontal portion 270 of each of the brackets 268 is mechanically coupled to the channels 252. In some examples, the brackets 268 are directly coupled to the channels 252. In some examples, the brackets 268 are coupled to the channels 252, via one or more intermediary brackets (e.g., the horizontal portion 270 and/or the vertical portion 272 may be coupled to at least one of the one or more intermediary brackets). For example, the one or more intermediary brackets may be coupled to the channels 252 (e.g., permanently coupled and/or removably coupled) and located inside the channels 252 and/or outside of the channels 252, such that coupling the brackets 268 to the intermediary brackets thus couples the one or more brackets 268 to the channels 252. The one or more intermediary brackets may be straight brackets, curved brackets, and/or have configurable dimensions desirable for particular use cases that may be recognized by those of ordinary skill in the art. The lower or bottom surface/wall of channel 252 (FIG. 11) may be coupled to one or more of a plurality of connectors 276 embedded in a laminate around the transverse beams 248, as described further herein and illustrated with respect to FIG. 12.

Referring to FIG. 10, the lower surface/wall of each of the channels 252 may be coupled to at least one of the brackets 268 to couple the slide rails 264 to the floor assembly 212. The vertical portion 272 is coupled to the slide rails 264. It should be understood that the vertical portion 272 can be permanently or removably coupled to the slide rails 264, while still allowing the slide rails 264 to be removably coupled to the floor assembly 212 (e.g., because of the mechanical couplings through the horizontal portions 270 of the brackets 268). Those of ordinary skill in the art should recognize that in some examples the brackets 268 may be coupled to the slide rails 264 at any location along the slide rails, such as depending on a particular use case (e.g., desired location of the channels 252).

To remove the slide rails 264, the mechanical couplings between the brackets 268 and the channels 252 may be unfastened to detach the slide rails 264 from the channels 252 and/or the floor assembly 212. In some examples, the mechanical couplings between the channels 252 and the floor assembly 212 may be unfastened to detach the channels 252 and/or the slide rails 264 from the floor assembly 212. Accordingly, maintenance can easily be performed on the slide rail assembly 236 (e.g., the slide rails 264 and/or the channels 252), as compared to conventional slide rail assemblies (e.g., including conventional slide rails) that may be permanently bonded to floor assemblies.

Referring again to FIG. 10, a width of each of the channels 252 (e.g., as measured along the longitudinal axis A) may be wider than a width of each of the transverse beams 248 (e.g., also as measured along the longitudinal axis A). The channels 252 may be uniformly spaced across at least a portion of the floor assembly 212. Additionally, or alternatively, the channels may be non-uniformly spaced across at least a portion of the floor assembly 212. Further, the width of the channels 252 may be narrower than a width of each of the transverse beams 248, such as at a region of the floor assembly at which a landing gear may be coupled.

It should be noted that since the transverse beams 248 are all the same height, the transverse beams 248 define a continuous surface along which the channels 252 may be coupled. The channels 252 may be coupled at any desirable location along the discrete surface depending on particular use cases. In some examples, the channels 252 may be spaced apart by a distance of about 20 inches, or about 30 inches, or about 40 inches, or about 50 inches, or about 60 inches, or any distance within any range defined by any of the foregoing values. Alternatively, in some examples, the channels 252 may be spaced apart at a configurable distance that is determined to be desirable by one of ordinary skill in the art for a particular application. Those of ordinary skill in the art should recognize that a number and/or location of the channels 252 may vary and/or be easily adjusted, such as according to particular use cases (e.g., in consideration of sliding lengths, axle configuration, etc.). Examples of particular use cases may be recognized by those of ordinary skill in the art, at least in light of teachings provided herein.

The channels 252 extend from the first wall 116R of the trailer 100 to the second wall 116L of the trailer 100. Additionally, the transverse beams 248 extend between the first wall 116R of the trailer 100 and the second wall of the trailer 100. The channels 252 may be fastened into the first wall 116R and the second wall 116L, such as in a similar manner as described earlier herein with respect to FIG. 9.

The vertical portion 272 of the brackets 268 may include one or more bracket cutouts 280 that are sized to correspond to one or more rail cutouts 282 in the slide rails 264. The bracket cutouts 280 and the rail cutouts 282 may be circles, squares, ovals, or any other shape. Further, the bracket cutouts 280 and the rail cutouts 282 may be similarly sized such that the rear wheel assembly 138 can be fastened to the slide rails 264 (e.g., via one or more fasteners, such as a pin, bolt, screw, rivet, etc.), without interference from the brackets 268.

In some examples, the brackets 268 may be disposed between the slide rails 264*a*, 264*b*. Alternatively, in some examples, the brackets may be disposed outside of the slide rails 264*a*, 264*b*. The brackets 268 are disposed on the channels 252 between adjacent transverse beams 248 of the same height.

FIG. 11 illustrates a bottom and front cross-sectional perspective view of the floor assembly 212. The floor assembly 212 includes a plurality of transverse composite beams 248. Illustratively, each of the plurality of transverse composite beams 248 is oriented generally orthogonal to the longitudinal axis A. More specifically, each of the plurality of transverse composite beams 248 extends in a direction substantially orthogonal to the longitudinal axis A between the right sidewalls 116R and the left sidewall 116L, respectively. The individual transverse composite beams 248 may be constructed in accordance with teachings described herein regarding composite materials. Specifically, each transverse composite beams 248 may be a preform of a structural foam core wrapped in an outer skin.

The plurality of transverse composite beams 248 are each the same height, length, and/or width. By making each of the composite beams 248 the same height, length, and/or width, cost of manufacturing the composite beams 248 is reduced, such as because they can be produced in relatively large quantities. Illustratively, an upper extent of the transverse composite beams 248 are generally flush with each other and directly adjacent upper surface 244 of the floor assembly 212. Similarly, the lower extent of the transverse composite beams 248 may be generally flush with each other as well and define the bottom surface 240 of the floor assembly 212.

The individual transverse composite beams 248 may be sized, shaped, and arranged in a manner that accommodates the needs of a particular application. For example, a relatively large number of small, closely-spaced beams may be used for high-weight/high-strength applications, whereas a relatively small number of large and/or spaced-apart beams may be used for low-weight/low-strength applications.

FIG. 12 illustrates a cross-sectional perspective view of the floor assembly 212. In some examples, the floor assembly 212 includes one or more embedded hardpoint connectors 276, which may be the same as, or similar to, the one or more embedded hardpoint connectors 276 described earlier herein with respect to FIG. 8. In some examples, the floor assembly 212 includes the embedded hardpoint connectors 276. Each connector 276 may be configured to receive one or more mechanical fasteners 292 from an adjacent component, such as the channel 252. Suitable mechanical fasteners 292 include bolts, screws, rivets, and nails, for example. In some examples, the connectors 276 include pre-tapped holes (not shown) that are sized and configured to receive the mechanical fasteners 292. Mechanical fasteners 292 may be desired, as opposed to adhesives, to facilitate efficient and inexpensive assembly and repairs of trailer 100.

In FIG. 12, connectors 276 are illustratively embedded in a select group of beams of the plurality of transverse beams 248. The beams 248 may be composite beams. In one embodiment, the connectors 276 are embedded in laminate outside of the beams 248. The laminate outside of the beams 248 may be between the beams 248 themselves and an adjacent layer of glass or carbon that form, at least in part, a total laminate layup. The remaining beams 248 may lack embedded connectors 276. One or more beams 248 lacking embedded connectors 276 may be arranged between the beams 248 having embedded connectors 276 (e.g., in adjacent laminate), such that the connectors 276 are longitudinally spaced apart along the cargo body 110.

Illustratively, connectors 276 are embedded generally adjacent to or in the bottom side 240 of composite floor 212, more specifically within laminate outside of the beams 248. Additionally, or alternatively, in some examples, the connectors 276 are embedded in another surface of the floor assembly 212 or span two or more surfaces of beams 248. The connectors 276 may be substantially planar, C-shaped, T-shaped, pi-shaped, bent, tubular, or other suitable shapes.

The connectors 276 may be constructed of metallic materials (e.g., steel, aluminum, titanium), polymeric materials, wood, or composite materials. In some examples, the connectors 276 are constructed of materials which are dissimilar from the composite material used to construct the corresponding beams. The connectors 276 may be fabricated by extrusion, pultrusion, sheet forming, roll forming, and/or casting, for example. The connectors 276 may also be single-piece or multi-piece constructs. For multi-piece constructs, the pieces may be welded, mechanically fastened, adhered, snap-fit, or otherwise coupled together.

The composite structures of the present disclosure (e.g., the composite floor assembly 112, 212) may be formed by a molding process. Additional information regarding the construction of composite structures is disclosed in the following patents and published patent applications, each of which is incorporated by reference in its entirety herein: U.S. Pat. Nos. 5,429,066, 5,664,518, 5,800,749, 5,830,308, 5,897,818, 5,908,591, 6,004,492, 6,013,213, 6,206,669, 6,497,190, 6,543,469, 6,723,273, 6,755,998, 6,869,561, 6,911,252, 8,474,871, 10,239,265, 10,919,579, and 11,338,862.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A cargo body, comprising:

a floor assembly comprising a first side and a second side; and a slide rail assembly, the slide rail assembly comprising one or more slide rails, the one or more slide rails being removably coupled to the second side of the floor assembly such that the one or more slide rails and the second side of the floor assembly are in direct contact when coupled to each other.

2. The cargo body of claim 1, wherein the floor assembly is a composite floor assembly.

3. The cargo body of claim 1, wherein at least a portion of the slide rail assembly is flush with the second side of the floor assembly.

4. The cargo body of claim 1, wherein the one or more slide rails are removably coupled to the floor assembly via one or more brackets.

5. The cargo body of claim 1, wherein the floor assembly comprises a plurality of transverse beams.

6. The cargo body of claim 5, wherein the one or more slide rails are oriented generally orthogonal to the plurality of transverse beams.

7. The cargo body of claim 1, wherein one or more channels are coupled to the floor assembly on the second side, and the one or more channels are disposed between the first side and at least a portion of the second side.

8. The cargo body of claim 1, wherein the slide rail assembly includes one or more channels, wherein the one or more channels are coupled flush to the second side of the floor assembly, and wherein the one or more slide rails are coupled to the one or more channels.

9. The cargo body of claim 7, wherein the cargo body further comprises a first wall and a second wall, the first and second walls extending generally orthogonal to the first side and the second side of the floor assembly, the one or more channels being fastened into the first wall and the second wall.

10. A cargo body, comprising:

a floor assembly comprising a first side and a second side, the second side defining a bottom extent; and a slide rail assembly, the slide rail assembly comprising one or more slide rails, and at least a portion of the slide rail assembly being flush with the second side of the floor assembly such that the portion of the slide rail assembly is generally at the same vertical height as the bottom extent of the second side.

11. The cargo body of claim 10, wherein the floor assembly is a composite floor assembly, and wherein a plurality of connectors are embedded in the composite floor assembly.

12. The cargo body of claim 11, further comprising one or more channels, wherein the one or more channels are coupled to the composite floor assembly, via the plurality of connectors.

13. The cargo body of claim 10, wherein the one or more slides rails are removably coupled to the floor assembly.

14. The cargo body of claim 10, wherein the floor assembly comprises a plurality of transverse beams, and wherein the one or more slide rails are oriented generally orthogonal to the plurality of transverse beams.

15. The cargo body of claim 10, further comprising one or more channels, a first wall, and a second wall, wherein the first and second walls extend orthogonal to the first side and the second side of the floor assembly, and wherein the one or more channels are fastened into the first wall and the second wall.

16. A cargo body, comprising:

a floor assembly comprising a first side and a second side;

one or more channels being directly coupled to the floor assembly, on the second side;

a first wall; and a second wall, the first and second walls extending orthogonal to the first side and the second side of the floor assembly, the one or more channels being fastened into the first wall and the second wall.

17. The cargo body of claim 16, wherein the cargo body further comprises a slide rail assembly, the slide rail assembly comprising one or more slide rails.

18. The cargo body of claim 17, wherein the one or more slide rails are in contact with the second side of the floor assembly.

19. The cargo body of claim 17, wherein the one or more slide rails are removably coupled to the second side of the floor assembly.

20. The cargo body of claim 17, wherein the one or more channels are coupled flush to the second side of the floor assembly, and wherein the one or more slide rails are coupled to the one or more channels.

21. The cargo body of claim 7, wherein the one or more slide rails are removably coupled to the floor assembly via one or more brackets, and the one or more brackets are positioned within the one or more channels.

22. The cargo body of claim 10, wherein an upper extent of the side rail assembly is in direct contact with the bottom extent of the second side of the floor assembly.

* * * * *